US011550343B1

(12) United States Patent
Chakraborty

(10) Patent No.: US 11,550,343 B1
(45) Date of Patent: Jan. 10, 2023

(54) SMART AND IOT CONNECTED LIQUID LEVEL MONITORING WITH REMOTE DIAGNOSTIC AND MAINTENANCE CAPABILITY

(71) Applicant: Zurn Industries, LLC, Milwaukee, WI (US)

(72) Inventor: Arindam Chakraborty, Milwaukee, WI (US)

(73) Assignee: Zurn Industries, LLC, Milwaukee, WI (US)

( * ) Notice: Subject to any disclaimer, the term of this patent is extended or adjusted under 35 U.S.C. 154(b) by 0 days.

(21) Appl. No.: 17/527,952

(22) Filed: Nov. 16, 2021

(51) Int. Cl.
*G05D 9/02* (2006.01)

(52) U.S. Cl.
CPC ....................... *G05D 9/02* (2013.01)

(58) Field of Classification Search
CPC ................ G05D 9/12; Y10T 137/7306; Y10T 137/7313; Y10T 137/7413; Y10T 137/8158; Y10T 137/8326; Y10T 137/8342; Y10T 137/86187; C02F 1/40
See application file for complete search history.

(56) References Cited

U.S. PATENT DOCUMENTS

| | | | | |
|---|---|---|---|---|
| 6,444,119 B1 * | 9/2002 | Mains, Jr. | .......... | B01D 17/0205 210/DIG. 5 |
| 8,594,851 B1 * | 11/2013 | Smaidris | .................. | G05D 9/12 137/88 |
| 8,943,911 B1 * | 2/2015 | Terrell | ................ | G01F 23/0007 73/865.8 |
| 2002/0166803 A1 * | 11/2002 | Mazurek | ............ | B01D 17/0214 210/538 |
| 2014/0048004 A1 * | 2/2014 | Russick | .................... | G05D 9/12 114/183 R |
| 2016/0122209 A1 * | 5/2016 | Newman, Jr. | ............. | C02F 9/00 210/744 |

FOREIGN PATENT DOCUMENTS

WO          WO-0161429 A1 *   8/2001   ............... G05D 9/12

OTHER PUBLICATIONS

ATS GREASEwatch, "State-of-the-Art Grease Monitoring", website: https://www.atsgreasewatch.com/, 2022 Copyright (2 Pages).

* cited by examiner

*Primary Examiner* — Hailey K. Do
(74) *Attorney, Agent, or Firm* — Michael Best & Friedrich LLP

(57) ABSTRACT

Methods and systems for remotely monitoring and controlling holding tank subsystems. One system includes an electronic processor communicatively coupled to a memory. The electronic processor, through execution of the instructions stored in the memory, is configured to receive tank data associated with a first holding tank of a holding tank subsystem. The tank data indicates a material level of a material stored in the first holding tank. The electronic processor is also configured to compare the material level to a material transfer threshold. The electronic processor is also configured to, in response to the material level satisfying the material transfer threshold, control the holding tank subsystem to transfer at least a portion of the material in the first holding tank to the second holding tank as a transfer event.

18 Claims, 7 Drawing Sheets

SMART AND IOT CONNECTED LIQUID LEVEL MONITORING WITH REMOTE DIAGNOSTIC AND MAINTENANCE CAPABILITY

FIELD

Embodiments relate to methods and systems of monitoring and controlling a holding tank, such as a grease tank, and, more particularly, to providing smart and internet of things ("IoT") connected liquid level monitoring with remote diagnostic and maintenance capabilities.

SUMMARY

In the field of facility or building management, there is a desire to monitor performance of equipment, products, or fixtures, such as, for example, holding tanks or grease tanks. As one example, a building manager may want to monitor a liquid or material level associated with a holding tank. Such monitoring may be performed for predictive maintenance, alerting, collecting utilization data, or the like. For example, monitoring may indicate current material levels (i.e., how full a holding tank is), such that the holding tank may maintain a grease level, a water level, another sediment level, or the like at a desired level. As another example, monitoring may generate alerts, such as a high material or sediment level alert, a service or maintenance alert, a flood or overflow alert, and the like.

Accordingly, embodiments described herein provide remote monitoring and controlling of a holding tank subsystem. In particular, embodiments described herein provide for an enterprise-wide management system for various facilities and/or holding tank subsystems thereof connected to one or more networks. A holding tank subsystem may include one or more holding tanks, at least one sensor, and an end point device. In some embodiments, a holding tank subsystem is also associated with a facility device (for example, a local control panel or dashboard display associated with the holding tank subsystem). The end point device may collect data associated with an operation of the holding tank subsystem (for example, tank data) and provide that data to the system. The data may be manipulated, analyzed, and displayed to a user of the system to provide intelligent information on usage, repair needs, preventative maintenance needs, replenishment needs, and the like. Determining and displaying the data associated with holding tank subsystem(s) provides a building owner or manager, maintenance personnel, and other users with insights into the utilization of the holding tank subsystem and/or holding tanks thereof.

As a result, the enterprise may develop efficiencies and receive data on how one or more holding tank subsystems and/or holding tanks thereof are being used to better service, manage, and maintain holding tank subsystem(s). Accordingly, embodiments described herein provide remote monitoring and management of holding tank data that enables cost savings by optimizing a timeliness of dispatching cleaning personnel to service or clean a holding tank and by maintaining material levels balanced as required by code or regulations. Additionally, embodiments described herein provide enable a user to set or control material level thresholds, cleaning schedules, maintenance schedules, and the like. Further, embodiments described herein monitor material levels with respect to material level thresholds and trigger various alerts or warnings for a user, operation(s) associated with the holding tank subsystem, and the like.

For example, one embodiment provides a system for remotely monitoring and controlling holding tank subsystems. The system includes an electronic processor communicatively coupled to a memory. The electronic processor, through execution of the instructions stored in the memory, is configured to receive tank data associated with a first holding tank of a holding tank subsystem, wherein the tank data indicates a material level of a material stored in the first holding tank. The electronic processor is also configured to compare the material level to a material transfer threshold. The electronic processor is also configured to, in response to the material level satisfying the material transfer threshold, control the holding tank subsystem to transfer at least a portion of the material in the first holding tank to the second holding tank as a transfer event.

Another embodiment provides a method for remotely monitoring and controlling holding tank subsystems. The method includes receiving, from a sensor, tank data associated with a first holding tank of a holding tank subsystem, wherein the tank data indicates a material level of a material stored in the first holding tank. The method also includes comparing, with an electronic processor, the material level to a material transfer threshold. The method also includes, in response to the material level satisfying the material transfer threshold, controlling, with the electronic processor, the holding tank subsystem to transfer at least a portion of the material in the first holding tank to the second holding tank as a transfer event and providing, with the electronic processor, a transfer event alert indicating that the transfer event occurred between the first holding tank and the second holding tank.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
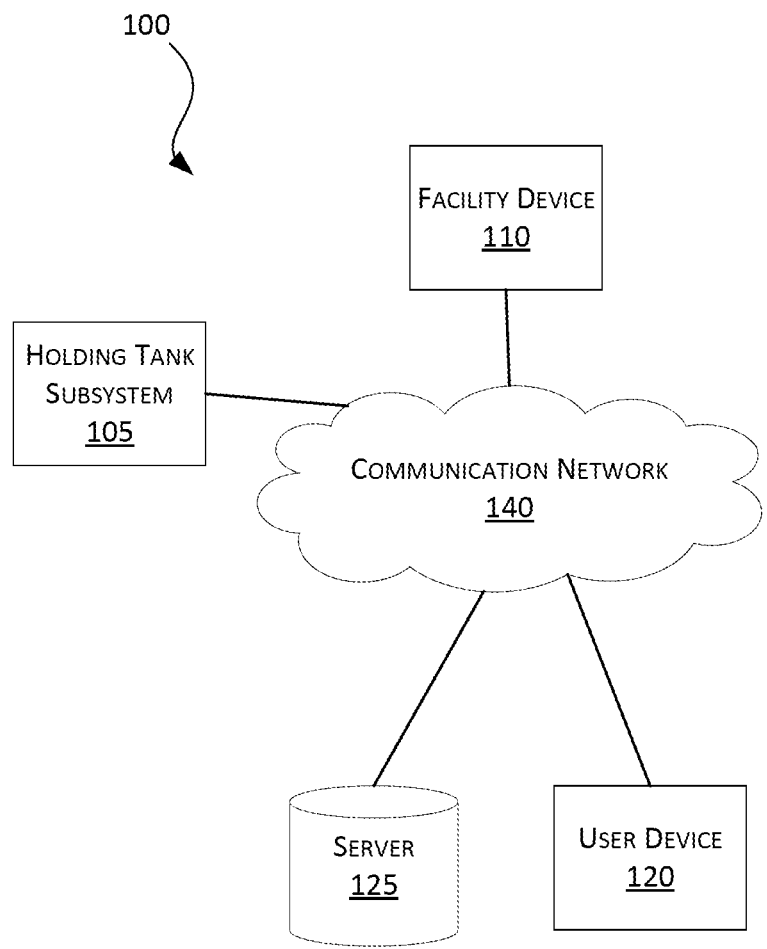
FIG. 1 schematically illustrates a system for monitoring and managing a holding tank subsystem associated with a facility according to some embodiments.

FIG. 1 illustrates a system 100 for monitoring and controlling a holding tank subsystem associated with a facility according to some embodiments. In the illustrated example, the system 100 includes a holding tank subsystem 105, a facility device 110, a user device 120, and a server 125 (for example, a cloud-based server). In some embodiments, the system 100 includes fewer, additional, or different components than illustrated in FIG. 1 in various configurations. For example, the system 100 may include multiple holding tank subsystems 105, facility devices 110, user devices 120, servers 125, or a combination thereof. Also, in some embodiments, one or more of the components of the system 100 may be distributed among multiple devices, combined within a single device, or a combination thereof.

The holding tank subsystem 105, the facility device 110, the user device 120, and the server 125 communicate over one or more wired or wireless communication networks 140. Portions of the communication networks 140 may be implemented using a wide area network ("WAN"), such as the Internet or a LoRa system, a local area network ("LAN"), such as a Bluetooth™ network or Wi-Fi, and combinations or derivatives thereof. Accordingly, components of the system 100 may be configured to communicate via Bluetooth, Wi-Fi, Zigbee, LTE/Cellular, wired ethernet, or the like. As one example, one or more components of the holding tank subsystem 105 may communicate via LoRa with the facility device 110. Alternatively or in addition, in some embodiments, one or more components of the system 100 communicate directly as compared to through the communication network 140. For example, in some embodiments, the one or more components of the holding tank subsystem 105 communicate directly with the facility device 110. Also, in some embodiments, the components of the system 100 may communicate through one or more intermediary devices not illustrated in FIG. 1.

The holding tank subsystem 105 is configured to store materials, such as liquid waste materials (for example, fat, grease, oil, and the like). The holding tank subsystem 105 is associated with a facility, such as a restaurant or food service provider, that produces waste materials. As one example, when the holding tank subsystem 105 is associated with a restaurant (as the facility), the holding tank subsystem 105 may store used fryer grease produced by the restaurant. As noted above, the system 100 may include any number of holding tank subsystems 105. In some embodiments, each holding tank subsystem 105 included in the system 100 is associated with the same facility. Alternatively, in other embodiments, the holding tank subsystems 105 included in the system 100 are associated with different facilities. For example, multiple facilities may link to one holding tank subsystem 105 to deposit waste materials. In other embodiments, multiple facilities may link to its own holding tank subsystem 105 while the group of holding tank subsystems 105 may be linked for communication and monitoring purposes.

Figure 2:
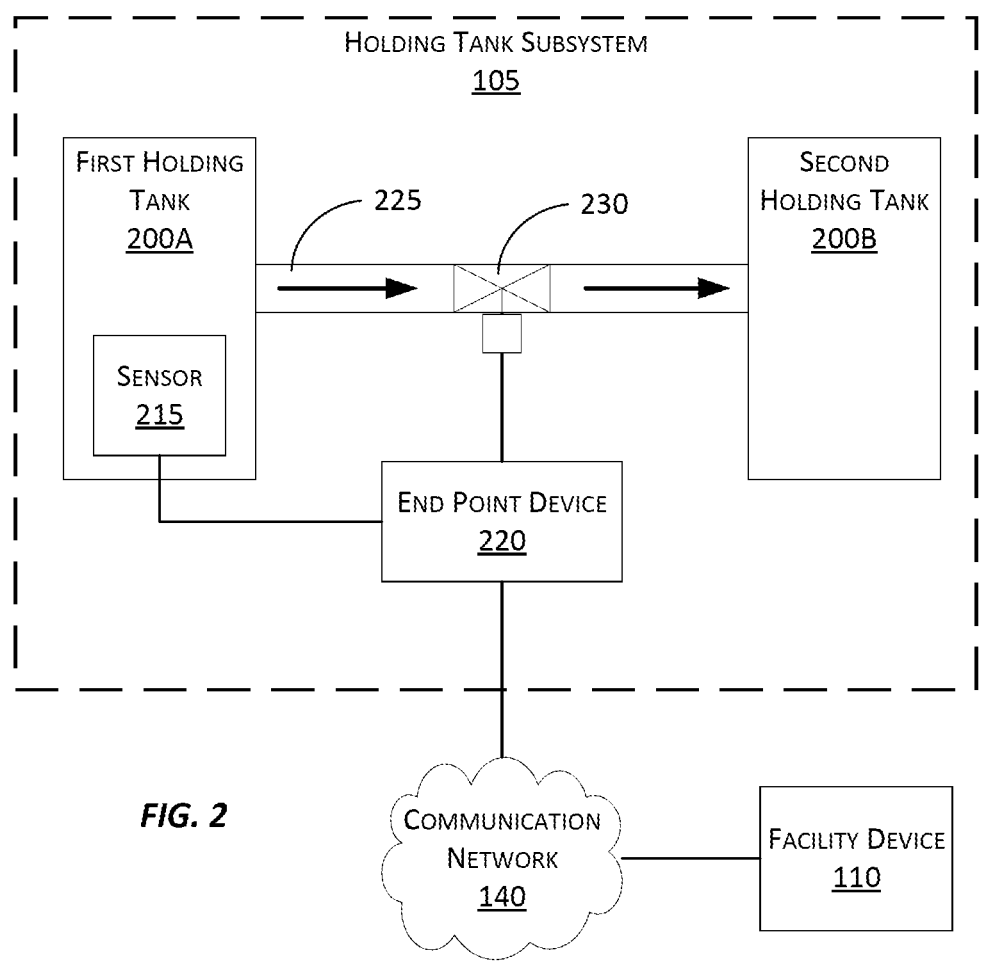
FIG. 2 schematically illustrates a holding tank subsystem included in the system of FIG. 1 according to some embodiments.

The holding tank subsystem 105 may include one or more holding tanks 200. For example, as illustrated in FIG. 2, the holding tank subsystem 105 includes a first holding tank 200A and a second holding tank 200B. In the example illustrated, the holding tank subsystem 105 also includes a sensor 215, an end point device 220, and a flow controller 230. In some embodiments, the holding tank subsystem 105 includes fewer, additional, or different components than illustrated in FIG. 2 in various configurations. For example, the holding tank subsystem 105 may include multiple sensors 215, end point devices 220, flow controllers 230, or a combination thereof. As one example, the holding tank subsystem 105 may include a second sensor associated with the second holding tank 200B. As yet another example, the holding tank subsystem 105 may include a second end point device that is associated with receiving data associated with the second holding tank 200B, where the data may be collected by a second sensor associated with the second holding tank 200B. Additionally, the holding tank subsystem 105 may include any number of holding tanks and the two holding tanks illustrated in FIG. 2 are purely for illustrative purposes. For example, in some embodiments, the holding tank subsystem 105 may include more than two holding tanks (for example, a third holding tank, a fourth holding tank, and the like). In such embodiments, the holding tank subsystem 105 may include additional components (for example, multiple sensors 215, end point devices 220, flow controllers 230, or a combination thereof) in various configurations based on a total number of holding tanks 200 included in the holding tank sub system 105.

As illustrated in FIG. 2, the first holding tank 200A is coupled to the second holding tank 200B by a passageway 225. The passageway 255 may be, for example, a pipe, a tunnel, a tube, or the like. The passageway 225 is configured to transport a material or mixture between holding tanks 200. In the illustrated example, the passageway 225 is configured to transport material from the first holding tank 200A to the second holding tank 200B (as indicated by the arrows positioned within the passageway 225).

The flow controller 230 is configured to control or manage a flow of material between the first holding tank 200A to the second holding tank 200B via the passageway 225). For example, the flow controller 230 may allow a flow of material or block a flow of material. Alternatively or in addition, the flow controller 230 may regulate a flow rate of material between holding tanks 200. Accordingly, the flow controller 230 may include, for example, a valve, an actuator, or the like. As described in greater detail below, the flow controller 230 may control or manage the flow of material between the holding tanks 200 (for example, between the first holding tank 200A and the second holding tank 200B via the passageway 225) based on control signals received from the end point device 220. Accordingly, as illustrated in FIG. 2, in some embodiments, the flow controller 230 is communicatively coupled (via one or more wired or wireless communication networks) to the end point device 220 such that the flow controller 230 may interface with (or be controlled by) the end point device 220. As one example, the flow controller 230 may include a door assembly positioned at an egress or outlet of the first holding tank 200A, where the door assembly is controlled by a control valve (for example, controls the opening and closing of the door assembly). The control valve may communicate (via a wired or wireless connection) with the end point device 220. Accordingly, the control valve may interface with (or be controlled by) the end point device 220 such that the control valve may control the opening or closing of the door assembly, which ultimately controls the flow of material between the first holding tank 200A and the second holding tank 200B. The end point device 220 will be described in greater detail below with respect to FIG. 4.

As illustrated in FIG. 2, the flow controller 230 is positioned within the passageway 225. With respect to the example configuration illustrated in FIG. 2, it should be understood that the illustrated position or placement of the flow controller 230 with respect to the passageway 225, the first holding tank 200A, the second holding tank 200B, or a combination thereof should not be limited to the example configuration (or positioning) illustrated in FIG. 2. For example, in some embodiments, the flow controller 230 may be positioned closer to the first holding tank 200A or closer to the second holding tank 200B than illustrated in FIG. 2. Alternatively or in addition, the flow controller 230 may be positioned immediately adjacent to the first holding tank 200A (for example, at an opening or egress port of the first holding tank 200A). As one example, the flow controller 230 may be positioned or placed at a connection point (or coupling or connector) of the first holding tank 200A and the passageway 225. As another example, the flow controller 230 may be incorporated in a coupling or connector to couple the first holding tank 200A and the passageway 225. As yet another example, the flow controller 230 (or a portion or component thereof) may be positioned within the first holding tank 200A.

The holding tank subsystem 105 also includes the sensor 215. The sensor 215 may include, for example, an ultrasonic sensor, a weight sensor, a pressure sensor, a temperature sensor, or the like. The sensor 215 is configured to collect or sense data (tank data) associated with a holding tank 200 (for example, the first holding tank 200A). Tank data may include, for example, a material level (for example, a waste material level, a water level, or the like), an accumulation rate of a material, a temperature (for example, a temperature in the first holding tank 200A, the second holding tank 200B, the passageway 225, or the like), a pressure (for example, a pressure of the first holding tank 200A, the second holding tank 200B, the passageway 225, or the like), an amount of solid materials, an amount of liquid materials, a status associated with a material transfer event, and the like. As one example, the holding tank data may include a current level of grease in the first holding tank 200A.

Figure 3:
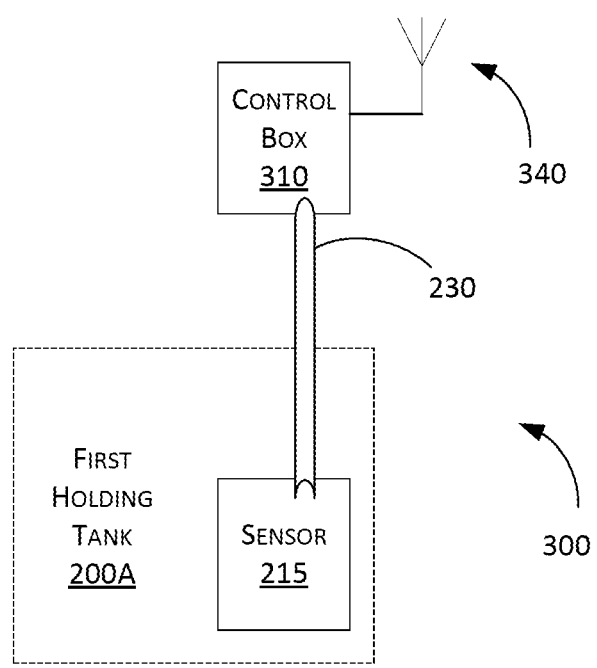
FIG. 3 schematically illustrates a sensing subsystem included in the holding tank subsystem of FIG. 2 according to some embodiments.

In some embodiments, the sensor 215 may include (or be a component of) a sensing subsystem as illustrated in FIG. 3. As illustrated in FIG. 3, a sensing subsystem 300 may include the sensor 215 and a control box 310. As seen in FIG. 3, the sensor 215 is positioned within the first holding tank 200A. The sensor 215 is configured to collect raw data associated with the first holding tank 200A (for example, tank data). The sensor 215 transmits the raw data to the control box 310 (via, for example, one or more wired or wireless communication networks). In the illustrated example of FIG. 3, the sensor 215 is coupled to the control box 310 via a communication pipe or line 230. Accordingly, in some embodiments, the sensor 215 and the control box 310 communicate over a wired connection, as illustrated in FIG. 3. The control box 310 may include or house control components or circuitry for communicating or transmitting the raw data to an external device, such as, for example, the end point device 220, as described in greater detail below. In some embodiments, the sensing subsystem 300 includes an antenna 340 for wireless communication of the raw data to the external device. Alternatively or in addition, the sensing subsystem 300 may include a wired connection for communicating the raw data to the external device.

As noted above, in some embodiments, the holding tank subsystem 105 may include additional sensors (for example, a second sensor, a third sensor, and the like). In such embodiments, the second sensor may be associated with the second holding tank 200B and configured to collect or sense tank data with respect to the second holding tank 200B, as similarly described with respect to the sensor 215 and the first holding tank 200A. In some embodiments, a plurality of sensors 215 are employed in one tank. It is noted that if a plurality of sensors 215 are employed in one tank, the sensors 215 may be the same or different.

As illustrated in FIG. 2, the sensor 215 (or a component of the sensing subsystem 300) generally includes a communication link with the end point device 220. Accordingly, in some embodiments, the end point device 220 is associated with a single holding tank 200 (for example, the first holding tank 200A), a single holding tank subsystem 105 (for example, the holding tank subsystem 105), or a combination thereof. However, in other embodiments, the end point device 220 is associated with multiple holding tanks 200, multiple holding tank subsystems 105, or a combination thereof. As one example, the end point device 220 may be associated with a single holding tank 200 (for example, a first holding tank 200A), as illustrated in FIG. 2. As another example, the end point device 220 may be associated with multiple holding tanks 200 included in a single holding tank subsystem 105 (for example, the first holding tank 200A and the second holding tank 200B of the holding tank subsystem 105). As yet another example, the end point device 220 may be associated with multiple holding tanks 200 across multiple holding tank subsystems 105.

Figure 4:
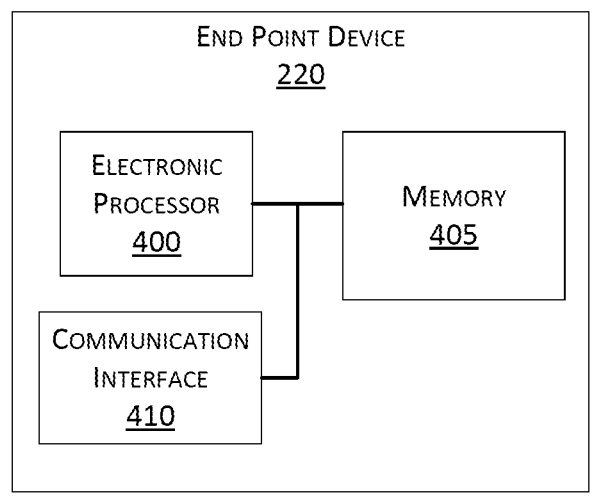
FIG. 4 schematically illustrates an end point device included in the holding tank subsystem of FIG. 2 according to some embodiments.

FIG. 4 schematically illustrates the end point device 220 according to some embodiments. In the illustrated example, the end point device 220 includes an electronic processor 400, a memory 405, and a communication interface 410. The electronic processor 400, the memory 405, and the communication interface 410 communicate wirelessly, over one or more communication lines or buses, or a combination thereof. In some embodiments, one or more components of the end point device 220 may be distributed among multiple devices, integrated into a single device, or a combination thereof. In some embodiments, the end point device 220 may perform additional functionality other than the functionality described herein. In some embodiments, the end point device 220 may include additional, different, or fewer components than those illustrated in FIG. 2 in various configurations.

The communication interface 410 allows the end point device 220 to communicate with devices external to the end point device 220. For example, the end point device 220 may communicate with the sensor 215 (or a component of the sensing subsystem 300 of FIG. 3), the flow controller 230, the facility device 110, the user device 120, the server 125 or a combination thereof through the communication interface 410. The communication interface 410 may include a port for receiving a wired connection to an external device (for example, a universal serial bus ("USB") cable and the like), a transceiver for establishing a wireless connection to an external device (for example, over one or more communication networks 140, such as the Internet, LAN, a WAN, such as a LoRa network or system, and the like), or a combination thereof. As one example, in some embodiments, the communication interface 410 includes a port for receiving a wired connection between the end point device 220 and the sensor 215 (or a component of the sensing subsystem 300 of FIG. 3). As another example, in some embodiments, the communication interface 410 includes a radio or transceiver for establishing a wireless connection, over a LoRa system or network, between the end point device 220 and the facility device 110.

Figure 5:
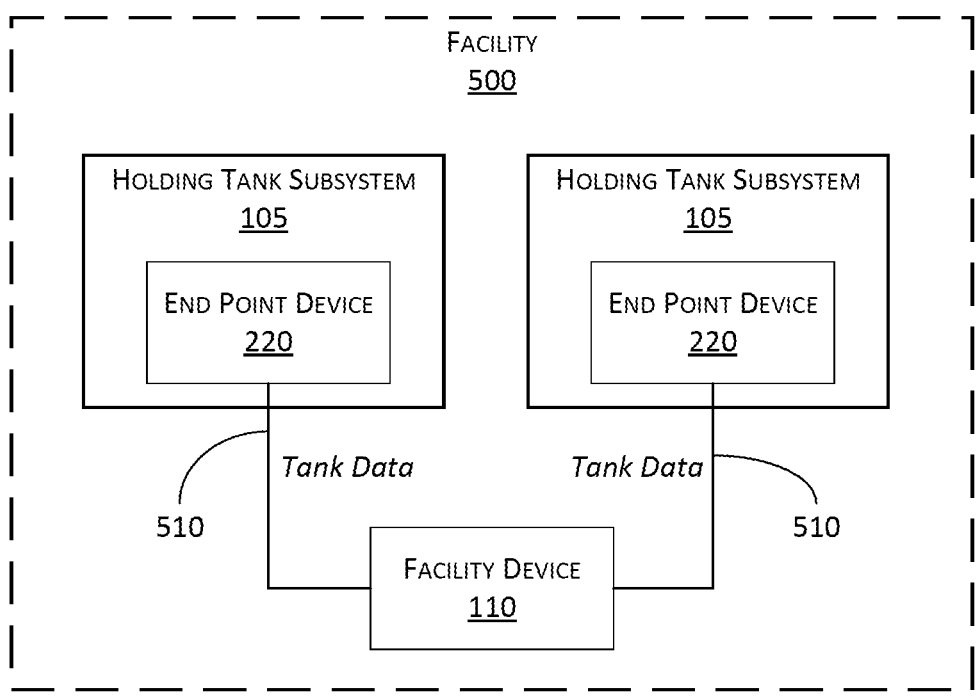
FIG. 5 schematically illustrates an example facility according to some embodiments.

The electronic processor 400 includes a microprocessor, an application-specific integrated circuit ("ASIC"), or another suitable electronic device for processing data, and the memory 405 includes a non-transitory, computer-readable storage medium. The electronic processor 400 is configured to access and execute computer-readable instructions ("software") stored in the memory 405. The software may include firmware, one or more applications, program data, filters, rules, one or more program modules, and other executable instructions. For example, the software may include instructions and associated data for performing a set of functions, including the methods described herein. For example, in some embodiments, the electronic processor 400 is configured to enable controlling and/or monitoring of the operation of the holding tank subsystem 105 (or a holding tank 200 therein). In some embodiments, the electronic processor 400 enables controlling and/or monitoring of the operation of the holding tank 200 by receiving raw data (for example, tank data) from the sensor 215 (or a component of the sensing subsystem 300), converting the tank data for transmission, and enabling transmission of the converted data to, for example, the facility device 110, the user device 120, the server 125, another component of the system 100, or a combination thereof. Accordingly, in some embodiments, the electronic processor 400 is configured to interact with and collect data regarding an operation of the holding tank subsystem 105 (or a holding tank 200 therein, such as the first holding tank 200A) via the sensor 215 (or a component of the sensing subsystem 300). For example, FIG. 5 illustrates an example facility 500 according to some embodiments. As illustrated in FIG. 5, the facility 500 includes a plurality of end point devices 220 associated with a plurality of corresponding holding tank subsystems 105. As illustrated in FIG. 5, the end point devices 220 communicate data (for example, tank data) collected from the corresponding sensors 215 to the facility device 110 (via, for example, one or more communication lines 510).

Figure 6:
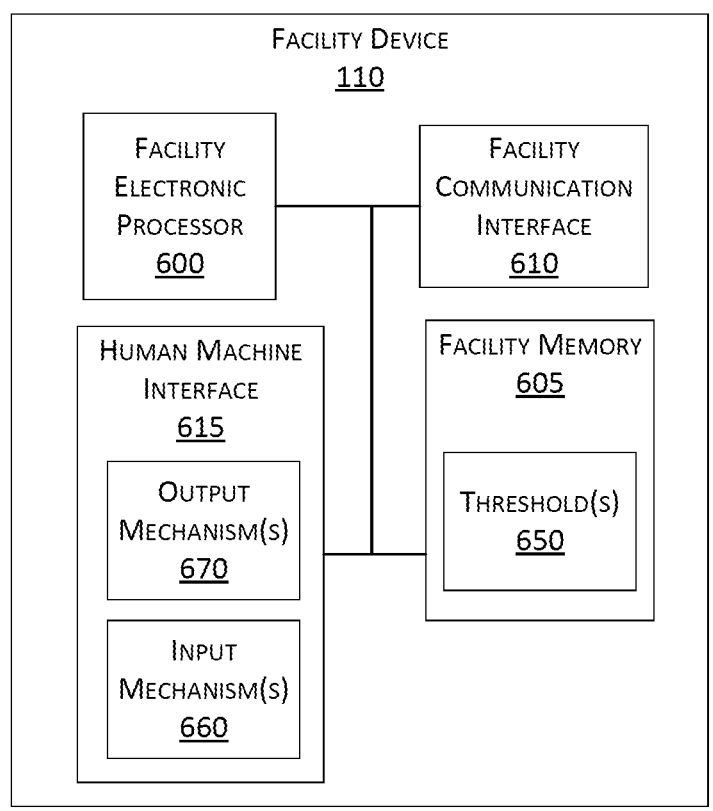
FIG. 6 schematically illustrates a facility device included in the holding tank subsystem of FIG. 2 according to some embodiments.

FIG. 6 illustrates the facility device 110 according to some embodiments. In the illustrated example, the facility device 110 includes a facility electronic processor 600, a facility memory 605, a facility communication interface 610, and a human machine interface 615. The facility electronic processor 600, the facility memory 605, the facility communication interface 610, and the human machine interface 615 communicate wirelessly, over one or more communication lines or buses, or a combination thereof. The facility device 110 may include additional, different, or fewer components than those illustrated in FIG. 6 in various configurations. For example, in some embodiments, the facility device 110 includes multiple human machine interfaces 625. In some embodiments, one or more components of the facility device 110 may be distributed among multiple devices, integrated into a single device, or a combination thereof. In some embodiments, the facility device 110 may perform additional functionality other than the functionality described herein. Also, the functionality described herein as being performed by the facility device 110 may be distributed among multiple devices.

The facility communication interface 610 allows the facility device 110 to communicate with devices external to the facility device 110. For example, as illustrated in FIGS. 1 and 2, the facility device 110 may communicate with the end point device 220, the user device 120, the server 125, another component of the holding tank subsystem 105, or a combination thereof through the facility communication interface 610. The facility communication interface 610 may include a port for receiving a wired connection to an external device (for example, a USB cable and the like), a transceiver for establishing a wireless connection to an external device (for example, over one or more communication networks 140, such as the Internet, a LAN, a WAN, such as a LoRa system, and the like), or a combination thereof.

The facility electronic processor 600 (for example, a microprocessor, an ASIC, or another suitable electronic device for processing data) is configured to access and execute computer-readable instructions ("software") stored in the facility memory 605 (for example, a non-transitory, computer-readable storage medium). The software may include firmware, one or more applications, program data, filters, rules, one or more program modules, and other executable instructions. For example, the software may include instructions and associated data for performing a set of functions, including the methods described herein.

For example, in some embodiments, the facility electronic processor 600 executes instructions for monitoring and controlling the holding tank subsystem 105. As described in greater detail below, the facility electronic processor 600 may access (or receive) and process data (tank data) received from one or more of the end point devices 220, the sensor 215, or a combination thereof to monitor and control the holding tank subsystem 105. In some embodiments, the facility electronic processor 600 performs material level monitoring to determine current material levels associated with (or stored in) the holding tank subsystem 105 (or holding tank 200 therein). The facility electronic processor 600 may perform the current material level monitoring using tank data received from the end point device 220, the sensor 215, or a combination thereof. For example, in response to receiving the raw data (tank data) from the end point device 220, the sensor 215, or a combination thereof, the facility electronic processor 600 may determine current material levels associated with one or more holding tanks 200 (for example, the first holding tank 200A). A material level may include, for example, a grease level, a fat level, an oil level, and the like (for example, waste material levels). Alternatively or in addition, a material level may include, for example, a water level, a sludge level, or the like.

Alternatively or in addition, in some embodiments, the facility electronic processor 600 monitors and controls the holding tank subsystem 105 using the received data (tank data) and one or more thresholds 650, such as a waste material threshold, an overflow threshold, a material transfer threshold, and the like, as described in greater detail below. In some embodiments, the facility electronic processor 600 may monitor the holding tank subsystem 105 to generate and provide alerts such as, for example, a high material or sediment level alert, a service or maintenance alert, a flood or overflow alert, and the like, based on one or more thresholds 650 (for example, as holding tank subsystem data). Alternatively or in addition, in some embodiments, the facility electronic processor 600 may monitor the holding tank subsystem 105 to control the holding tank subsystem 105 (for example, an operation of one or more holding tanks 200 therein) based on the threshold 650, as described in greater detail below. As one example, the facility electronic processor 600 may control the holding tank subsystem 105 to perform a material transfer event based on current waste material levels and a material transfer threshold (for example, transport a material from the first holding tank 200A to the second holding tank 200B via the passageway 225).

In some embodiments, after performing a material transfer event, the first holding tank 200A initiates a cleaning process, a calibration process, or a combination thereof. A cleaning process may include cleaning the first holding tank 200A using, for example, a cleaner or cleansing chemical mixture. As one example, the first holding tank 200A may include one or more sprayers positioned inside the first holding tank 200A. The sprayers may be configured to dispense (or spray) a waste material cleaner on one or more walls or surfaces inside the first holding tank 200A to clean the first holding tank 200A. A calibration process may include, for example, determining a remaining portion of materials in the first holding tank 200A after performing the material transfer event and calibrating one or more thresholds based on the remaining portion of materials. For example, after performing a material transfer event, the first holding tank 200A may still have some portion of materials (for example, waste materials), such as residual waste materials. Prior to performing additional operations (such as a subsequent material transfer event), one or more thresholds associated with the additional operations may need to be updated (or calibrated) to take into account the remaining portion of materials (for example, the residual waste materials).

As illustrated in FIG. 6, the thresholds 650 may be stored in the facility memory 605. However, in other embodiments, the thresholds 650 may be stored by another device or component of the system 100 (for example, a memory of another device or component of the system 100), such as, for example, the end point device 220, the server 120, or the like. In some embodiments, the threshold 650 is a manufacturer preset threshold or default threshold. As one example, the threshold 650 may be set based on a recommended cleaning or maintenance schedule or frequency. As another example, the threshold 650 may be set based on a maximum material capacity for the holding tank 200.

Alternatively or in addition, in some embodiments, the threshold 650 is a user set threshold. In such embodiments, the facility electronic processor 600 may receive the threshold 650 through the facility communication interface 610 (via the communication network 140) from a remote device, such as, for example, the user device 120, the server 125, or a combination thereof. Alternatively or in addition, the facility electronic processor 600 may receive the threshold 650 through the one or more input mechanism(s) or device(s) of the facility device 110 (for example, an input mechanism positioned within or near a housing of the facility device 110). As one example, a user may set a threshold 650 (for example, a waste material threshold) based on a desired cleaning or maintenance schedule. Accordingly, when a user wants the holding tank subsystem 105 to be serviced more frequently, the user may set a waste material threshold to be more sensitive (for example, by lowering the waste material threshold). As another example, a user may set a threshold 650 (for example, a warning threshold) based on a desired reminder or alerting schedule. Accordingly, when a user wants more advanced notice of a need for action, the user may set a warning threshold to be more sensitive (for example, by lowering the warning threshold such that the user is given a longer period of time to take action prior to the waste material levels satisfying the severe threshold).

In some embodiments, the thresholds 650 are specific to a particular holding tank subsystem 105 (or a holding tank 200 therein). Accordingly, in such embodiments, the facility electronic processor 600 identifies the holding tank subsystem 105 (or a holding tank 200 therein) and accesses one or more thresholds 650 specific to the identified holding tank subsystem 105 (or holding tank 200 therein). In some instances, a first holding tank subsystem (or holding tank(s) therein) may have different characteristics or parameters than another holding tank subsystem (or holding tank(s) therein). As one example, a first holding tank subsystem may include holding tanks having a first size while a second holding tank subsystem may include holding tanks having a second size, where the first size is different than the second size. Accordingly, in order to take into consideration difference characteristics or parameters of different holding tank subsystems 105 (or holding tanks 200 therein), the facility electronic processor 600 may access and implement thresholds 650 that are based on different characteristics or parameters.

The facility device 110 also includes the human machine interface 615 for interacting with a user. As illustrated in FIG. 6, the human machine interface 615 may include one or more input mechanisms 660, one or more output mechanisms 670, or a combination thereof. Accordingly, in some embodiments, the human machine interface 615 allows a user to interact with (for example, provide input to and receive output from) the facility device 110. For example, the human machine interface 615 may include a touch screen, a mechanical button, a display device (for example, a liquid crystal display ("LCD")), a printer, a speaker, a microphone, another input/output device, or a combination thereof.

As one example, in some embodiments, the human machine interface 615 includes a display device (as an output mechanism 670). The display device may be included in the same housing as the facility device 110 or may communicate with the facility device 110 over one or more wired or wireless connections. For example, in some embodiments, the display device is a monitor, a television, or a projector positioned at or near the holding tank subsystem 105. In some embodiments, the display device displays information, such as a current material level, tank data, a holding tank status (for example, whether a threshold 650 has been satisfied), a warning or alert, holding tank subsystem data, other holding tank related information, or a combination thereof. For example, the display device may display a warning or alert when waste material level(s) satisfy (or exceed) a waste material threshold.

As another example, in some embodiments, the human machine interface 615 includes a speaker (as an output mechanism 670). The speaker may be included in the same housing as the facility device 110 or communicate with the facility device 110 over one or more wired or wireless connections. In some embodiments, the speaker provides information audibly. For example, when an overflow threshold is satisfied, the speaker may sound an alarm or audible warning indicating that an overflow event is occurring or is imminent.

As yet another example, in some embodiments, the human machine interface 615 includes one or more gauges (as an output mechanism 670). Each gauge may be associated with a particular material and provide information associated with that particular material (for example, a current material level). Alternatively or in addition, each gauge may be associated with a holding tank 200 of the holding tank subsystem 105 (for example, a first gauge associated with the first holding tank 200A and a second gauge associated with the second holding tank 200B). For example, in some embodiments, the human machine interface 615 includes a first gauge associated with a waste material level for the first holding tank 200A and a second gauge associated with a waste material level for the second holding tank 200B.

As yet another example, in some embodiments, the human machine interface 615 includes a set of visual indicators (as an output mechanism 670), such as one or more LEDs or lights. Each visual indicator may be configured to indicate a holding tank status, such as a material level (for example, normal level, warning level, or severe level) for a holding tank 200, such as the first holding tank 200A, the second holding tank 200B, and the like. In some embodiments, a visual indicator indicates a holding tank status by illuminating a specific color. For example, the visual indicator may illuminate a green color to indicate a normal level, a yellow color to indicate a warning level, and a red color to indicate a severe level. Alternatively or in addition, the visual indicators may flash or strobe in different patterns or at different speeds to indicate a tank status.

In some embodiments, the facility device 110 serves as a gateway or intermediary device that collects data from the electronic processors 200 of one or more of the end point devices 105. As one example, in some embodiments, the facility device 110 may function as a local control panel or dashboard display for one or more holding tank subsystems 105. The facility device 110 may then process and forward the collected data (for example, the holding tank subsystem data) to another component for processing. Holding tank subsystem data may include, for example, the tank data, alerting or threshold data associated with applying one or more of the thresholds 650 to the tank data, or a combination thereof. For example, in some embodiments, the facility device 110 forwards the holding tank subsystem data to a remote server for virtual processing (for example, the server 125). In some embodiments, the functionality (or a portion thereof) described as being performed by the facility device 110 may be performed by another remote device or server, such as, for example, the user device 120, the server 125, or a combination thereof. For example, in some embodiments, the functionality (or a portion thereof) described as being performed by the facility device 110 may be performed by the end point device 200 (via the electronic processor 400 executing instructions stored in the memory 405).

Returning to FIG. 1, the user device 120 and the server 125 are computing devices, such as a desktop computer, a laptop computer, a tablet computer, a terminal, a smart telephone, a smart television, a smart wearable, or another suitable computing device that interfaces with a user. Although not illustrated in FIG. 1, the user device 120 and the server 125 may include similar components as the end point device 220, the facility device 110, or a combination thereof, such as an electronic processor (for example, a microprocessor, an ASIC, or another suitable electronic device), a memory (for example, a non-transitory, computer-readable storage medium), a communication interface, such as a transceiver, for communicating over the communication network 140 and, optionally, one or more additional communication networks or connections, and one or more human machine interfaces.

In some embodiments, the server 125 may include multiple electronic processors, multiple memory modules, multiple communication interfaces, or a combination thereof. Also, it should be understood that the functionality described herein as being performed by the server 125 may be performed in a distributed nature by a plurality of computers or computing devices located in various geographic locations. For example, the functionality described herein as being performed by the server 125 may be performed by a plurality of computers included in a cloud computing environment.

The server 125 is configured to monitor and manage one or more facilities, including the holding tank subsystems 105 therein. In some embodiments, the server 125 (via an electronic processor of the server 125) may receive the holding tank subsystem data from the facility device 110. In response to receiving the holding tank subsystem data, the server 115 may process the holding tank subsystem data in order to determine usage information or patterns associated with the one or more facilities, including the holding tank subsystems 105 thereof. The server 125 may store the usage information or patterns in, for example, a memory of the server 125. Alternatively or in addition, the server 125 may transmit the usage information or patterns to a remote device for storage.

A user may interact with and access data associated with one or more facilities, such as one or more of the holding tank subsystems 105 therein (for example, the usage information or patterns determined by the server 125). The user device 120 may be used by an end user, such as a facility entity, to monitor and manage the holding tank subsystem 105, one or more holding tanks 200 of the holding tank subsystem 105, or a combination thereof. For example, a user may access and interact with the data determined by the server 125 to view and understand usage patterns, which may allow a facility entity or maintainer insights or intelligent information on, for example, usage, how to optimize cleaning and maintenance schedules, repair needs, preventative maintenance needs, replenishment needs, or a combination thereof. For example, to communicate with the server 125 (i.e., the usage information or patterns determined by the server 125), the user device 120 may store a browser application or a dedicated software application executable by an electronic processor for interacting with the server 125.

Figure 7:
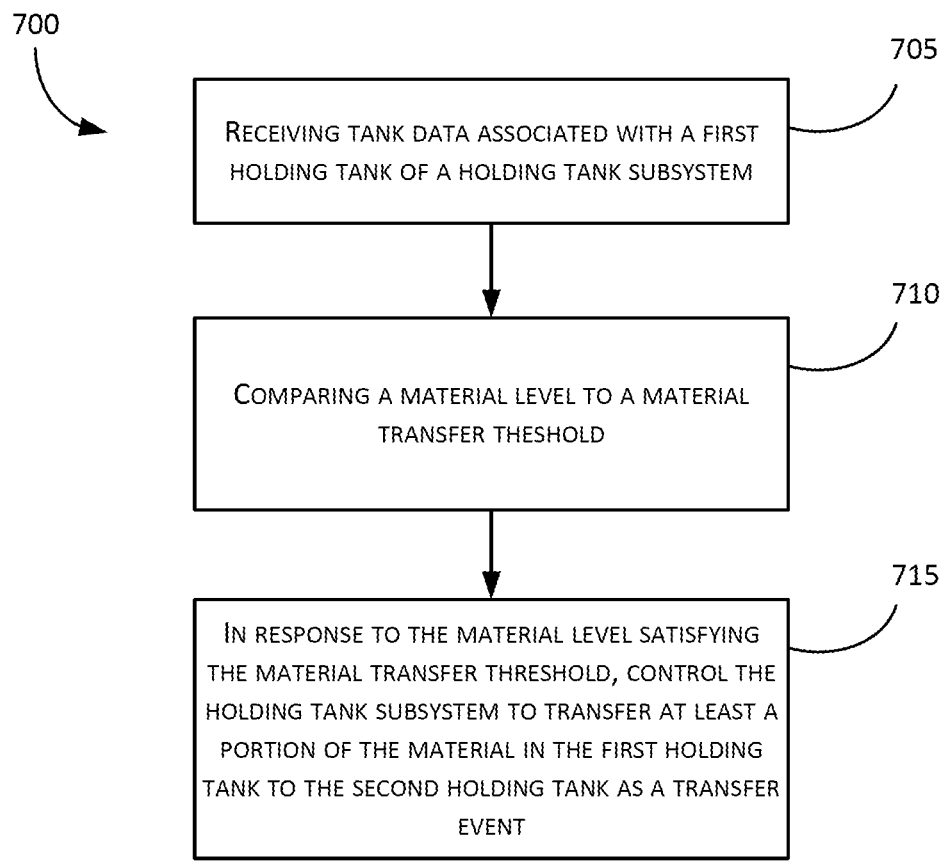
FIG. 7 is a flowchart illustrating a method of monitoring a holding tank subsystem associated with a facility using the system of FIG. 1 according to some embodiments.

FIG. 7 is a flowchart illustrating a method 700 for monitoring and controlling holding tank subsystems 105 according to some embodiments. The method 700 is described herein as being performed by the facility device 110 (the facility electronic processor 600 executing instructions). However, as noted above, the functionality performed by the facility device 110 (or a portion thereof) may be performed by other devices, such as, for example, the end point device 220, the user device 120, the server 125, another component of the system 100, or a combination thereof.

As seen in FIG. 7, the method 700 includes receiving data (as tank data) associated with the first holding tank 200A of the holding tank subsystem 105 (at block 705). As noted above, the facility electronic processor 600 may receive the tank data from the end point device 220, the sensor 215 (or a component of the sensing subsystem 300 of FIG. 3), or a combination thereof. The facility electronic processor 600 may receive the tank data as raw data. In some embodiments, the data indicates (or includes) a material level associated with a material stored in the holding tank subsystem 105 (or a holding tank 200 thereof). As one example, the data may indicate a current material level associated with a waste material stored in the first holding tank 200A (for example, a total amount of waste material currently stored in the first holding tank 200A). Alternatively or in addition, the data may indicate a current material level associated with a specific waste material stored in the first holding tank 200A, such as a current fat level, a current grease level, a current oil level, or the like. In some embodiments, the data indicates (or includes) additional or different data or information associated with the holding tank subsystem 105 (or a holding tank 200 therein).

After receiving the data (at block 705), the facility electronic processor 600 compares the material level to a threshold 650 (at block 710). In some embodiments, the threshold 650 is a material transfer threshold. Accordingly, in some embodiments, the facility electronic processor 600 compares the material level to a material transfer threshold. The material transfer threshold represents a waste material level (for example, an amount of waste material) that triggers a transfer event (for example, a waste material level that necessitates the corresponding holding tank 200 to be cleaned or emptied). A transfer event may refer to the emptying or transferring of material from one holding tank (for example, as a primary holding tank) to another holding tank (for example, as a secondary holding tank). Accordingly, satisfying (being equal to or exceeding) the transfer threshold may trigger a transfer event.

As noted above, the thresholds 650 (including the material transfer threshold) may be stored in the facility memory 605. Accordingly, in some embodiments, the facility electronic processor 600 accesses the material transfer threshold from the facility memory 605. Alternatively or in addition, the thresholds 650 (including the material transfer threshold) may be stored by another device or component of the system 100 (for example, a memory of another device or component of the system 100), such as, for example, the end point device 220, the server 125, or the like. In such embodiments, the facility electronic processor 600 accesses the material transfer threshold from the other device or component of the system 100 (for example, a memory of another device or component of the system 100).

In response to the material level satisfying the material transfer threshold, the facility electronic processor 600 controls the holding tank subsystem 105 to transfer at least a portion of the material (for example, the waste material) in the first holding tank 200A to the second holding tank 200B (at block 715). In some embodiments, the facility electronic processor 600 controls the holding tank subsystem 105 by generating and transmitting a command or control signal (a transfer command) to a component of the holding tank subsystem 105. As one example, the facility electronic processor 600 may transmit the transfer command to end point device 220. In response to receiving the transfer command, the end point device 220 may forward the transfer command to the flow controller 230. As noted above, the flow controller 230 is configured to control or manage a flow of material (for example, waste material) between the holding tanks 200 (for example, from the first holding tank 200A to the second holding tank 200B via the passageway 225). Accordingly, in response to receiving the transfer command, the flow controller 230 enables the flow of material (for example, the transfer of at least a portion of the material in the first holding tank 200A to the second holding tank 200B). The flow controller 230 may enable the flow of material by at least partially opening (or allowing the flow of material) from the first holding tank 200A to the second holding tank 200B via the passageway 225. Alternatively or in addition, in some embodiments, the facility electronic processor 600 transmits the transfer command directly to the flow controller 230.

In some embodiments, in response to the material level satisfying the material transfer threshold, the facility electronic processor 600 generates and transmits a transfer event alert to a remote device, such as, for example, the user device 120, the server 125, another component of the system 100, or a combination thereof. The transfer event alert may indicate that a transfer event occurred. In some embodiments, the transfer event alert includes additional information associated with the performance of the transfer event. As one example, the transfer event alert may identify the holding tank subsystem 105 associated with the transfer event. As another example, the transfer event alert may identify the holding tanks 200 involved in the transfer event (for example, the first holding tank 200A and the second holding tank 200B). As yet another example, the transfer event alert may indicate a time, a date, a current material level, a geographical location of the holding tank subsystem 105, a facility associated with the holding tank subsystem 105, and the like. In response to receiving the transfer event alert at the remote device, a user (such as a facility manager) may view and interact with the transfer event alert (and the information indicated by the transfer event alert). As one example, when the facility electronic processor 600 transmits the transfer event alert to the user device 120, the user device 120 may display the transfer event alert (via a display device of the user device 120) to a user such that a user is notified that a transfer event occurred and may be informed as to the additional information associated with the transfer event.

Alternatively or in addition, in some embodiments, in response to the material level satisfying the material transfer threshold, the facility electronic processor 600 generates and provides the transfer event alert locally via, for example, one or more of the output mechanisms 670 of the facility device 110. As one example, when the output mechanism 670 is a display device, the facility device 110 displays the transfer event alert (and the additional information associated with the transfer event). As another example, when the output mechanism 670 is a visual indicator, the facility device 110 may indicate that a transfer event occurred by illuminated the visual indicator (for example, illuminating a visual indicator associated with a transfer event).

In some embodiments, the facility electronic processor 600 performs additional functionality with respect to the holding tank subsystem 105 in addition to or alternatively to the functionality associated with material transfer events. For example, in some embodiments, the facility electronic processor 600 compares information included in the data to one or more additional thresholds 650. As noted above, the thresholds 650 may also include, for example, a waste material threshold (for example, a warning threshold, a severe threshold, or the like), an overflow threshold, and the like.

Accordingly, in some embodiments, the facility electronic processor 600 compares the material level to a waste material threshold, including, for example, a warning threshold, a severe threshold, or the like. The waste material thresholds may function as a series of maintenance reminders such that when a waste material threshold is satisfied a notice or alert is provided to a user of the holding tank subsystem 105. The warning threshold may represent a waste material level associated with an imminent need for action by a user, such as emptying or cleaning a holding tank 200 of the holding tank subsystem 105 (for example, an imminent maintenance action). As one example, when a waste material level satisfies (equals or exceeds) the warning threshold, the holding tank 200 may need to be emptied or cleaned in the near future. The severe threshold may be associated with a waste material level associated with a severe or immediate need for action by a user (for example, an immediate maintenance action). As one example, when a waste material level satisfies (equals or exceeds) the severe threshold, the holding tank 200 may need to be emptied or cleaned as soon as possible. Accordingly, the severe threshold may be based on a maximum waste material level associated with the holding tank 200 (for example, a waste material capacity of the holding tank 200).

In some embodiments, the waste material threshold may be associated with a particular waste material, such as, for example, a fat material, an oil material, a grease material, or the like. For example, in some embodiments, the thresholds 650 includes a plurality of waste material thresholds, where each waste material threshold is associated with a different waste materials (for example, a fat material threshold, an oil material threshold, and a grease material threshold). As one example, the thresholds 650 may include a first warning threshold associated with a fat material and a second warning threshold associated with a grease material. Alternatively or in addition, the waste material threshold may be associated with multiple waste materials (such as, for example, all of the waste materials included in the holding tank 200).

In some embodiments, when a waste material level satisfies (equals or exceeds) a waste material threshold (for example, the warning threshold, the severe threshold, or a combination thereof), the facility electronic processor 600 generates a waste material alert (for example, a warning alert, a severe alert, or a combination thereof). The facility electronic processor 600 may transmit the waste material alert to a remote device (for example, the user device 120, the server 125, or the like) to be provided to a user, as similarly described above with respect to the material transfer threshold. Alternatively or in addition, the facility electronic processor 600 may provide the waste material alert locally via one or more of the output mechanisms 270 of the facility device 110, as similarly described above with respect to the material transfer threshold. It should be understood that the waste material thresholds may include additional thresholds in addition to the warning threshold and the severe threshold such that additional reminders or alerts may be provided to a user. For example, the waste material thresholds may include a third threshold, a fourth threshold, and the like, where each additional threshold provides additional reminders or alerts according to, for example, a different or additional alerting timing or schedule.

Alternatively or in addition, in some embodiments, the threshold 650 is an overflow threshold. The overflow threshold may represent a maximum (or near maximum) capacity of water for the holding tank 200. For example, when a water level of a holding tank 200 satisfies (equals or exceeds) the overflow threshold, an overflow event may be occurring (i.e., the holding tank 200 may be overflowing), may occur in the near future, or the like. Accordingly, in some embodiments, the overflow threshold may be implemented for flood prevention purposes.

When a water level satisfies (equals or exceeds) an overflow threshold, the facility electronic processor 600 generates an overflow alert. The overflow alert may indicate that an overflow event is occurring or may occur in the near future. In some embodiments, the overflow alert includes additional information associated with the overflow event. For example, the overflow alert may include a time, a date, a geographical location, an identifier of the holding tank subsystem 105, an identifier of the holding tank 200, and the like. The facility electronic processor 600 may transmit the overflow alert to a remote device (for example, the user device 120, the server 125, or the like) to be provided to a user, as similarly described above with respect to the material transfer threshold. Alternatively or in addition, the facility electronic processor 600 may provide the overflow alert locally via one or more of the output mechanisms 270 of the facility device 110, as similarly described above with respect to the material transfer threshold. As one example, the facility device 110 may sound an alarm via a speaker (as an output mechanism 270) to indicate the occurrence or probability of the overflow event.

In some embodiments, the facility device 110 forwards the tank data, alerting or threshold data associated with applying one or more of the thresholds 650 to the tank data, or a combination thereof (as holding tank subsystem data) to a remote device, server, or database for virtual processing in the cloud, such as, for example, the user device 120, the server 124, or a combination thereof. As one example, a user may use the user device 120 (or another remote device) to access and interact with the holding tank subsystem data. The user may view and interact with usage patterns, which may allow a facility entity or maintainer insights into, for example, how to optimize cleaning and maintenance schedules (for example, for preventative or predicted maintenance), whether there is a need for additional holding tanks 200, holding tank subsystems 105, or a combination thereof, and the like. As noted above, in some embodiments, the server 125 is configured to monitoring and managing one or more facilities, including the holding tanks 200 or holding tank subsystems 105 therein. In some embodiments, the server 125 (via an electronic processor of the server 125) may receive the holding tank subsystem data from the facility device 110. In response to receiving the holding tank subsystem data, the server 125 may process the received data in order to determine usage information or patterns associated with the one or more facilities, including the holding tank subsystems 105 and/or holding tanks 200 thereof.

Thus, the embodiments provide, among other things, methods and systems of monitoring and controlling a holding tank, such as a grease tank, and more particularly, to providing smart and internet of things ("IoT") connected liquid level monitoring with remote diagnostic and maintenance capabilities. Various features and advantages of certain embodiments are set forth in the following claims.

What is claimed is:
1. A system for remotely monitoring and controlling holding tank subsystems, the system comprising:
   a holding tank subsystem comprising:
      a first holding tank;
      a second holding tank coupled to the first holding tank via a passageway; and a flow controller configured to control a flow of material between the first holding tank to the second holding tank via the passageway by blocking the flow of material; and an electronic processor communicatively coupled to a memory, wherein the electronic processor, through execution of instructions stored in the memory, is configured to receive tank data indicating a material level of a material stored in the first holding tank, compare the material level to a material transfer threshold, in response to the material level satisfying the material transfer threshold, provide a control signal to the flow controller to transfer at least a portion of the material in the first holding tank to the second holding tank as a transfer event by unblocking the passageway, after the transfer event, determine a remaining portion of the material stored in the first holding tank, and calibrate the material transfer threshold based on the remaining portion of the material.

2. The system of claim 1, wherein the electronic processor is configured to, in response to the material level satisfying the material transfer threshold, generate a transfer event alert indicating that the transfer event occurred between the first holding tank and the second holding tank.

3. The system of claim 1, wherein the material stored in the first holding tank is a waste material, the waste material including at least one selected from a group consisting of grease, fat, and oil.

4. The system of claim 1, wherein the electronic processor is configured to compare the material level to a waste material threshold and, in response to the material level satisfying the waste material threshold, generate a waste material alert indicating that the material level satisfies the waste material threshold.

5. The system of claim 1, wherein the passageway comprises a pipe, a tunnel, or a tube.

6. The system of claim 1, wherein the flow controller comprises a valve or an actuator.

7. The system of claim 1, wherein the flow controller is incorporated in a connection point or coupling of the first holding tank and the passageway.

8. The system of claim 1, wherein the flow controller is positioned within the first holding tank.

9. The system of claim 1, wherein the electronic processor is configured to transmit holding tank subsystem data to a remote device for virtual processing.

10. The system of claim 9, wherein the holding tank subsystem data includes at least one selected from a group consisting of the tank data and data associated with performing the transfer event.

11. The system of claim 1, wherein the tank data indicates a water level associated with the holding tank subsystem.

12. The system of claim 11, wherein the electronic processor is configured to compare the water level to an overflow threshold and, in response to the water level satisfying the overflow threshold, generate an overflow alert associated with the holding tank subsystem.

13. The system of claim 12, wherein the overflow threshold is a manufacturer set default threshold based on a water capacity associated with the holding tank subsystem.

14. A method for remotely monitoring and controlling holding tank subsystems, the method comprising:

receiving, from a sensor, tank data indicating a material level of a material stored in a first holding tank of a holding tank subsystem, wherein the first holding tank is coupled to a second holding tank of the holding tank subsystem via a passageway;

comparing, with an electronic processor, the material level to a material transfer threshold; and in response to the material level satisfying the material transfer threshold, providing, with the electronic processor, a control signal to a flow controller to transfer at least a portion of the material in the first holding tank to the second holding tank as a transfer event by unblocking the passageway, wherein the flow controller configured to control a flow of material between the first holding tank to the second holding tank via the passageway by blocking the flow of material, determining a remaining portion of the material stored in the first holding tank, calibrate the material transfer threshold based on the remaining portion of the material, and providing, with the electronic processor, a transfer event alert indicating that the transfer event occurred between the first holding tank and the second holding tank.

15. The method of claim 14, wherein providing the transfer event alert includes locally providing the transfer event alert via an output mechanism.

16. The method of claim 14, further comprising:

comparing the material level to a waste material threshold; and in response to the material level satisfying the waste material threshold, providing a waste material alert indicating that the material level satisfies the waste material threshold.

17. The method of claim 14, wherein receiving the tank data includes receiving tank data indicating a water level associated with the holding tank subsystem, and wherein the method further comprises:

comparing the water level to an overflow threshold; and in response to the water level satisfying the overflow threshold, providing an overflow alert associated with the holding tank subsystem.

18. The method of claim 14, wherein receiving the tank data includes receiving tank data indicating a waste material level of a waste material stored in the first holding tank.

* * * * *